(12) United States Patent
Kawano et al.

(10) Patent No.: US 10,033,981 B2
(45) Date of Patent: Jul. 24, 2018

(54) IMAGE PROCESSING APPARATUS

(71) Applicant: DENSO CORPORATION, Kariya, Aichi-pref. (JP)

(72) Inventors: Taiki Kawano, Nishio (JP); Masaki Masuda, Kariya (JP); Naoki Kawasaki, Kariya (JP); Kazuhisa Ishimaru, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/961,465

(22) Filed: Dec. 7, 2015

(65) Prior Publication Data

US 2016/0191890 A1 Jun. 30, 2016

(30) Foreign Application Priority Data

Dec. 8, 2014 (JP) ................................. 2014-248228

(51) Int. Cl.
  *H04N 13/00* (2018.01)
  *G06K 9/62* (2006.01)
  *H04N 13/02* (2006.01)
  *G06T 7/50* (2017.01)

(52) U.S. Cl.
  CPC ....... *H04N 13/0025* (2013.01); *G06K 9/6202* (2013.01); *G06K 9/6215* (2013.01); *G06T 7/50* (2017.01); *H04N 13/0239* (2013.01); *H04N 2013/0074* (2013.01)

(58) Field of Classification Search
  CPC ...... H04N 13/00–13/0497; H06T 7/50; G06K 9/6202; G06K 9/6215
  See application file for complete search history.

(56) References Cited

U.S. PATENT DOCUMENTS

| | | | |
|---|---|---|---|
| 7,660,458 B1* | 2/2010 | Saric | G06T 7/593 382/154 |
| 9,208,576 B2* | 12/2015 | Eggert | G06T 7/204 |
| 2004/0208357 A1* | 10/2004 | Tokuhashi | G06K 9/209 382/154 |

(Continued)

FOREIGN PATENT DOCUMENTS

| | | |
|---|---|---|
| JP | 2009-069114 A | 4/2009 |
| JP | 2011-243194 A | 12/2011 |

*Primary Examiner* — Sean Motsinger
(74) *Attorney, Agent, or Firm* — Knobbe, Martens, Olson & Bear, LLP

(57) ABSTRACT

In an image processing apparatus, an image acquiring unit acquires a first image and a second image that form stereoscopic images. A first sub-image extracting unit extracts first sub-images from the first image. A second sub-image extracting unit extracts second sub-images from the second image. A matching unit matches each pair of the first and second sub-images to determine a degree of similarity therebetween. A similar sub-image setting unit sets the second sub-image having a highest degree of similarity to the first sub-image to be a similar sub-image to the first sub-image. A brightness comparing unit compares in brightness each pair of the first and second sub-images. The matching unit is configured to, if a result of comparison made by the brightness comparing unit between a pair of the first and second sub-images is out of a predetermined brightness range, exclude such a pair of the first and second sub-images.

12 Claims, 7 Drawing Sheets

(56) References Cited

U.S. PATENT DOCUMENTS

| | | | |
|---|---|---|---|
| 2006/0115177 A1* | 6/2006 | Ishiga | H04N 5/3675 382/275 |
| 2008/0239097 A1* | 10/2008 | Izuhara | H04N 5/772 348/231.99 |
| 2011/0102548 A1* | 5/2011 | Kim | H04N 13/0221 348/46 |
| 2011/0279652 A1 | 11/2011 | Eggert et al. | |
| 2012/0127163 A1* | 5/2012 | Kim | H04N 13/0029 345/419 |
| 2013/0135439 A1* | 5/2013 | Kakuko | H04N 13/00 348/46 |
| 2013/0258064 A1* | 10/2013 | Bae | H04N 13/0239 348/47 |
| 2014/0184738 A1* | 7/2014 | Tomioka | H04N 13/0018 348/42 |
| 2014/0192163 A1* | 7/2014 | Shimizu | H04N 5/23212 348/46 |
| 2015/0077515 A1* | 3/2015 | Lee | H04N 13/0051 348/43 |
| 2016/0191890 A1* | 6/2016 | Kawano | H04N 13/0025 382/154 |
| 2017/0078648 A1* | 3/2017 | Saunders | G06F 3/017 |

* cited by examiner

FIRST IMAGE   SECOND IMAGE

IMAGE PROCESSING APPARATUS

CROSS-REFERENCE TO RELATED APPLICATION

This application is based on and claims the benefit of priority from earlier Japanese Patent Application No. 2014-248228 filed Dec. 8, 2014, the description of which is incorporated herein by reference.

BACKGROUND

Technical Field

The present invention relates to an image processing apparatus.

Related Art

Conventionally, a technique is known that acquires two images using a stereoscopic camera and provides a distance measurement via matching the two images. Typically, the matching is performed using brightness values of the images. Portions of the two images where the same target is captured may be different in brightness value. This can be caused by lens conditions of the stereoscopic camera, imager errors, aging degradation and the like. A counter measure thereagainst may include (1) a technique for comparing the two images and correcting one of the two images based on a brightness difference (see Japanese Patent Application Laid-Open Publication No. 2009-069114), and (2) a technique for matching the two images after local corrections of the images (Japanese Patent Application Laid-Open Publication No. 2011-243194).

However, for the techniques disclosed in Japanese Patent Application Laid-Open Publication No. 2009-069114 and Japanese Patent Application Laid-Open Publication No. 2011-243194, it has been difficult to sufficiently improve the matching accuracy.

In consideration of the foregoing, exemplary embodiments of the present invention are directed to providing an image processing apparatus capable of improving the matching accuracy.

SUMMARY

In accordance with a first exemplary embodiment of the present invention, there is provided an image processing apparatus including: an image acquiring unit configured to acquire a first image and a second image that form stereoscopic images; a first sub-image extracting unit configured to extract first sub-images from the first image; a second sub-image extracting unit configured to extract second sub-images from the second image; a matching unit configured to match each pair of the first and second sub-images to determine a degree of similarity between the pair of the first and second sub-images; a similar sub-image setting unit configured to, for each of the first sub-images extracted by the first sub-image extracting unit, set the second sub-image having a highest degree of similarity to the first sub-image, among the second sub-images extracted by the second sub-image extracting unit, to be a similar sub-image corresponding to the first sub-image; and a brightness comparing unit configured to compare in brightness each pair of the first and second sub-images. In the apparatus, the matching unit is configured to, if a result of comparison made by the brightness comparing unit between a pair of the first and second sub-images is out of a predetermined brightness range, exclude such a pair of the first and second sub-images from the pairs of the first and second sub-images to be matched.

This image processing apparatus is configured to, if it is determined by the brightness comparing unit that a pair of the first and second sub-images are not in a predetermined brightness range, such a pair of the first and second sub-images are excluded from the pairs of the first and second sub-images to be matched, so that matching does not have to be performed for such an excluded pair of the first and second sub-images not having normal brightness. This can enhance matching accuracy.

In accordance with a second exemplary embodiment of the present invention, there is provided an image processing apparatus including: an image acquiring unit configured to acquire a first image and a second image that form stereoscopic images; a first sub-image extracting unit configured to extract first sub-images from the first image; a second sub-image extracting unit configured to extract second sub-images from the second image; a matching unit configured to determine a degree of similarity between each pair of the first and second sub-images; a similar sub-image setting unit configured to, for each of the first sub-images extracted by the first sub-image extracting unit, set the second sub-image having a highest degree of similarity to the first sub-image, among the second sub-images extracted by the second sub-image extracting unit, to be a similar sub-image corresponding to the first sub-image; a brightness comparing unit configured to compare in brightness each pair of the first and second sub-images; and an information outputting unit configured to, if a result of comparison made by the brightness comparing unit between a pair of the first sub-image and its corresponding similar sub-image is out of a predetermined brightness range, output information indicative of such an event.

This image processing apparatus is configured to, if a pair of the first sub-image and its corresponding similar sub-image are out of a predetermined brightness range, information indicative of such an event will be outputted. For example, other devices operative to use the information outputted from the image processing apparatus can use the matching result properly in response to the information.

In accordance with a third exemplary embodiment of the present invention, there is provided an image processing apparatus including: an image acquiring unit configured to acquire a first image and a second image that form stereoscopic images; a first sub-image extracting unit configured to extract first sub-images from the first image; a second sub-image extracting unit configured to extract second sub-images from the second image; a matching unit configured to determine a degree of similarity between each pair of the first and second sub-images; a brightness comparing unit configured to compare in brightness each pair of the first and second sub-images; and a similar sub-image setting unit configured to, for each of the first sub-images extracted by the first sub-image extracting unit, determine one of the second sub-images extracted by the second sub-image extracting unit to be a similar sub-image corresponding to the first sub-image, based on results of determination made by the matching unit and results of comparison made by the brightness comparing unit.

DESCRIPTION OF SPECIFIC EMBODIMENTS

Embodiments of the present invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

First Embodiment

1. Image Processing Apparatus

Figure 1:
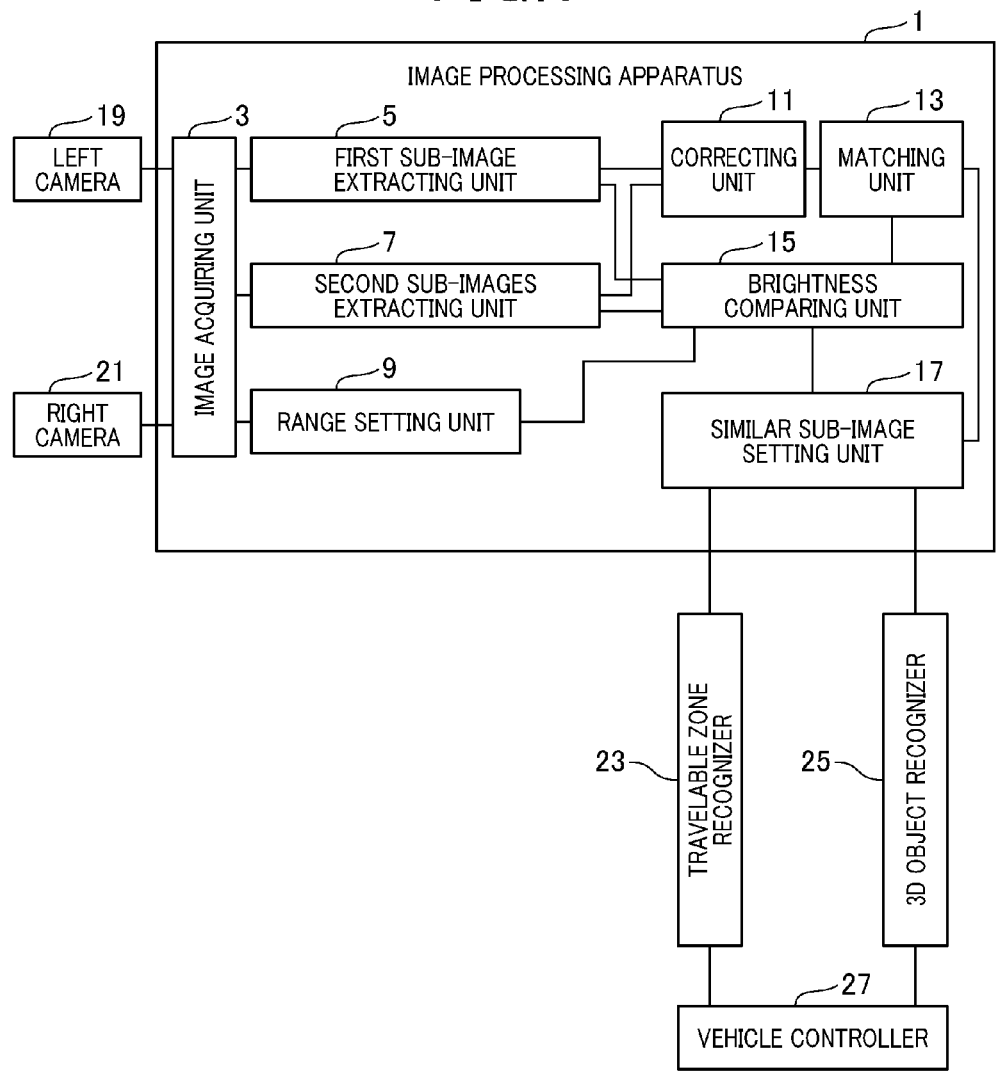
FIG. 1 is a block diagram of an image processing apparatus in accordance with a first embodiment of the present invention.

A configuration of the image processing apparatus 1 will now be described with reference to FIG. 1. The image processing apparatus 1 is mounted in a vehicle. In the following descriptions, the vehicle carrying the apparels is referred to as an own vehicle. The image processing apparatus 1 is a well-known computer including CPU, RAM, ROM and the like. Functions of functional blocks described later can be implemented by the CPU executing computer programs stored in the ROM.

The image processing apparatus 1 includes, as functional blocks, an image acquiring unit 3, a first sub-image extracting unit 5, a second sub-images extracting unit 7, a range setting unit 9, a correcting unit 11, a matching unit 13, a brightness comparing unit 15, and a similar sub-image setting unit 17. Functions of these units will be explained later.

Besides the image processing apparatus 1, the own vehicle includes a left camera 19, a right camera 21, a travelable zone recognizer 23, a three-dimensional (3D) object recognizer 25, and a vehicle controller 27. The left camera 19 is positioned looking forward on the left side of the lateral center of the own vehicle. The right camera 21 is positioned looking forward on the right side of the lateral center of the own vehicle. The left camera 19 and the right camera 21 form a stereoscopic camera. The left camera 19 and the right camera 21 are disposed at the same height above a road surface.

An image captured by the left camera 19 (hereinafter referred to as a first image) and an image captured by the right camera 21 (hereinafter referred to as a second image) are entered in the image acquiring unit 3. The first image and the second image form stereoscopic images. A target (e.g., a person, a vehicle, a bicycle, a motorcycle, a traffic light, a roadside object, a street sign or the like) located forward of the own vehicle is present in both the first and second images. Lateral positions of the left and right cameras 19, 21 are different, which may give rise to a difference between lateral positions of the same target in the first and second images (i.e., disparity). A disparity magnitude depends on a distance from the own vehicle to the target. That is, as the distance from the own vehicle to the target decreases, the disparity magnitude increases.

2. Processing to be Performed in the Image Processing Apparatus

Processing to be performed in the image processing apparatus 1 will now be described with reference to FIGS. 2 and 3. This processing is repeatedly performed every predetermined time interval.

Figure 2:
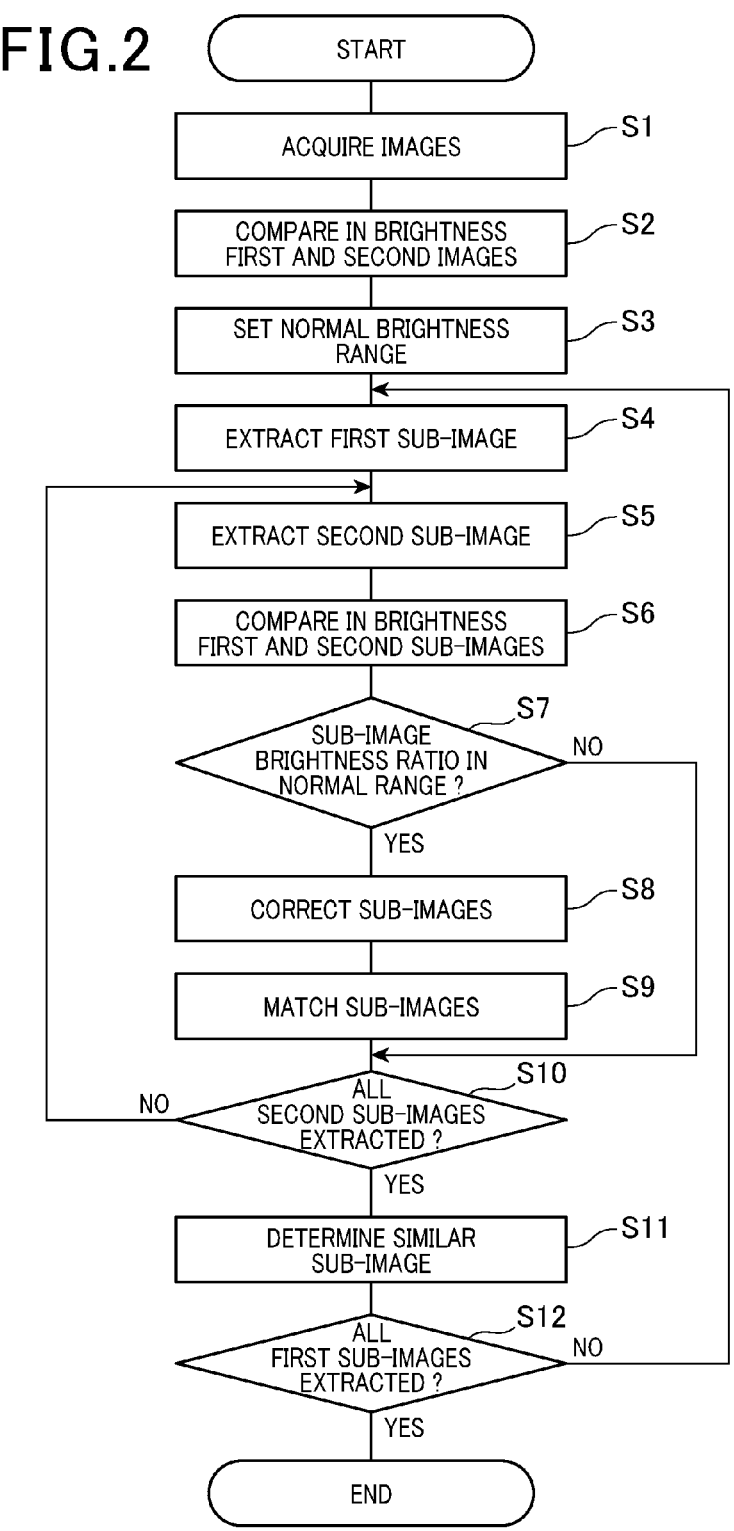
FIG. 2 is a flowchart of processing to be performed in the image processing apparatus of FIG. 1.

In step S1 of FIG. 2, the image acquiring unit 3 acquires the first image from the left camera 19 and the second image from the right camera 21.

In step S2, the range setting unit 9 compares in brightness the first and second images acquired in step S1 and then calculates an overall image brightness ratio R according to the following equation (1).

$$R = K2/K1 \tag{1}$$

where K1 represents an average brightness over the first image and K2 represents an average brightness over the second image.

In step S3, the range setting unit 9 sets a normal brightness range based on the overall image brightness ratio R calculated in step S2. The normal brightness range is a brightness range from R−d1 to R+d2, where d1 and d2 are positive numbers. d1 and d2 may be fixed values or may vary with the ratio R.

Figure 3:
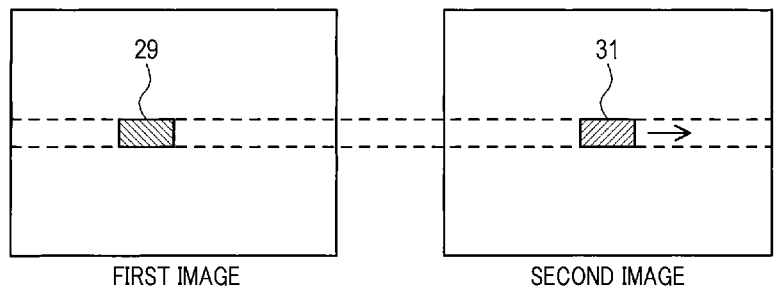
FIG. 3 is an example of first and second sub-images.

In step S4, the first sub-image extracting unit 5 extracts a first sub-image 29 from the first image acquired in step S1, as shown in FIG. 3. The first sub-image 29 is part of the first image, for example, a rectangular area of two pixels by two pixels.

The extraction of the first sub-image 29 is repeatedly performed until YES is determined in step S12 (described later). An extraction position of the first sub-image 29 is horizontally and vertically shifted by a predetermined amount each time step S4 is performed. More specifically, the extraction position of the first sub-image 29 is horizontally shifted by a predetermined amount at a vertically fixed and highest position from an upper left corner to an upper right corner of the first image each time step S4 is performed, and then the extraction position of the first sub-image 29 is horizontally shifted from left to right at each succeeding vertically-fixed position lowered by a predetermined amount from the top to the bottom of the first image, each time step S4 is performed. Such extraction of the first sub-image 29 is continued until the extraction position of the first sub-image 29 reaches the lowest right corner.

In step S5, the second sub-image extracting unit 7 extracts a second sub-image 31 from the second image acquired in step S1, as shown in FIG. 3. Like the first sub-image 29, the second sub-image 31 is part of the second image, for example, a rectangular area of two pixels by two pixels. The second sub-image 31 is vertically even with (or matches the vertical position of) the first sub-image 29 last extracted in step S4.

The extraction of the second sub-image 31 is repeatedly performed until YES is determined in step S10 (described later). An extraction position of the second sub-image 31 in the second image is shifted by a predetermined amount at the same vertically fixed position as the first sub-image 29, each time step S5 is performed. That is, each time step S5 is performed, the extraction position of the second sub-image 31 is horizontally shifted by a predetermined amount at a vertically fixed position from a left end to a right end of the second image.

In step S6, the brightness comparing unit 15 compares in brightness the first sub-image last extracted in step S4 and the second sub-image last extracted in step S5 to calculate a sub-image brightness ratio r according to the following equation (2).

$$r = bk2/bk1 \qquad (2)$$

where bk1 represents an average brightness over the first sub-image and bk2 represents an average brightness over the second sub-image.

In step S7, the brightness comparing unit 15 determines whether or not the sub-image brightness ratio r calculated in step S6 is in the normal brightness range set in step S3, that is, whether or not the sub-image brightness ratio r is normal. If in step S7 it is determined that the sub-image brightness ratio r is normal, then the process flow proceeds to step S8. Otherwise, the process flow proceeds to step S10.

In step S8, the correcting unit 11 corrects the brightness of each pixel of the first sub-image last extracted in step S4 and the brightness of each pixel of the second sub-image last extracted in step S5. This brightness correction is performed to reduce brightness variations caused by lens limb darkening. The brightness at the periphery of each uncorrected sub-image is lower than the brightness at the center of the uncorrected sub-image. The brightness correction in step S8 minimizes a difference between the brightness at the periphery of each sub-image and the brightness at the center of the sub-image. An amount of correction is preset at each pixel position in each sub-image based on the characteristics of the left camera 19 and the right camera 21.

In step S9 subsequent to step S8, the matching unit 13 determines a degree of similarity between the corrected first and second sub-images by matching these first and second sub-images. A matching method to be used here may be appropriately selected from well-known matching methods that include, but are not limited to, the following methods.

(a) Sum of Absolute Difference (SAD)

In SAD, two areas are compared by calculating an absolute brightness difference between each pixel in one of the areas being compared and the corresponding pixel in the other area and summing the absolute brightness differences over the pixels.

(b) Sum of Squared Difference (SSD)

In SSD, two areas are compared by calculating an absolute brightness difference between each pixel in one of the areas being compared and the corresponding pixel in the other area and summing the squared absolute brightness differences over the pixels.

(c) Zero-Mean Sum of Absolute Differences (ZSAD)

In ZSAD, two areas are compared by calculating an absolute brightness difference between each pixel minus an average brightness value in one of the areas being compared and the corresponding pixel minus an average brightness value in the other area and summing the absolute brightness differences over the pixels.

(d) Zero-Mean Sum of Squared Differences (ZSSD)

In ZSSD, two areas are compared by calculating an absolute brightness difference between each pixel minus an average brightness value in one of the areas being compared and the corresponding pixel minus an average brightness value in the other area and summing the squared absolute brightness differences over the pixels.

(e) Locally Scaled Sum of Absolute Differences (LSAD)

In LSAD, two areas are compared by calculating an absolute brightness difference between each pixel in one of the areas being compared and the corresponding pixel in the other area corrected by an average-brightness ratio and summing the absolute brightness differences over the pixels.

(f) Locally Scaled Sum of Squared Differences (LSSD)

In LSSD, two areas are compared by calculating an absolute brightness difference between each pixel in one of the areas being compared and the corresponding pixel in the other area corrected by an average-brightness ratio and summing the squared absolute brightness differences over the pixels.

(g) Normalized Cross Correlation (NCC)

In NCC, two areas are compared by calculating the normalized cross correlation.

(h) Zero-Mean Normalized Cross Correlation (ZNCC)

In ZNCC, two areas are compared by calculating the brightness of each pixel minus an average brightness value in each of the areas being compared and calculating the normalized cross correlation.

In step S10, it is determined whether or not all the second sub-images that are vertically even with the first sub-image 29 last extracted in step S4 have been extracted. If it is determined that all the second sub-images that are vertically even with the first sub-image 29 last extracted in step S4 have been extracted, then the process flow proceeds to step S11. Otherwise, the process flow proceeds to step S5.

In step S11, the similar sub-image setting unit 17 sets the second sub-image having the highest degree of similarity determined in step S9, among all the second sub-images extracted corresponding to the first sub-image last extracted in step S4, to be a similar sub-image corresponding to the first sub-image last extracted in step S4.

In step S12, it is determined whether or not all the first sub-images have been extracted from the first image. If it is determined that all the first sub-images have been extracted, then the process flow ends. Otherwise, the process flow proceeds to step S4.

The above processing allows each first sub-image of the first image and its corresponding similar sub-image of the second image to be identified. The first sub-image and its corresponding similar sub-image are areas capturing the same target.

The travelable zone recognizer 23 and the 3D object recognizer 25 calculate a distance from the own vehicle to the target located forward of the own vehicle (the target appearing in both the first sub-image of the first image and its corresponding similar sub-image of the second image) based on a difference (disparity) between the position of the first sub-image in the first image and the position of the similar sub-image in the second image. Based on the distance to the target, the vehicle controller 27 performs various processing (e.g., automated braking, automated steering, alert output and the like).

3. Advantages (1A) The image processing apparatus 1 is configured to, if the sub-image brightness ratio r for a pair of the first and second sub-images is out of the normal brightness range, exclude such a pair of the first and second sub-images, so that matching does not have to be performed for such an excluded pair of the first and second sub-images not having a normal brightness ratio. This can enhance matching accuracy.

(1B) The image processing apparatus 1 is configured to set the normal brightness range based on the comparison between the brightness of the first image and the brightness of the second image. This allows the normal brightness range to be set as appropriate to the first and second images.

(1C) The image processing apparatus 1 is configured to, prior to matching, correct the brightness of the first and second sub-images. The brightness correction is performed to reduce brightness variations caused by the lens limb darkening. Therefore, the image processing apparatus 1 can achieve more accurate matching.

Second Embodiment

1. Image Processing Apparatus

Figure 4:
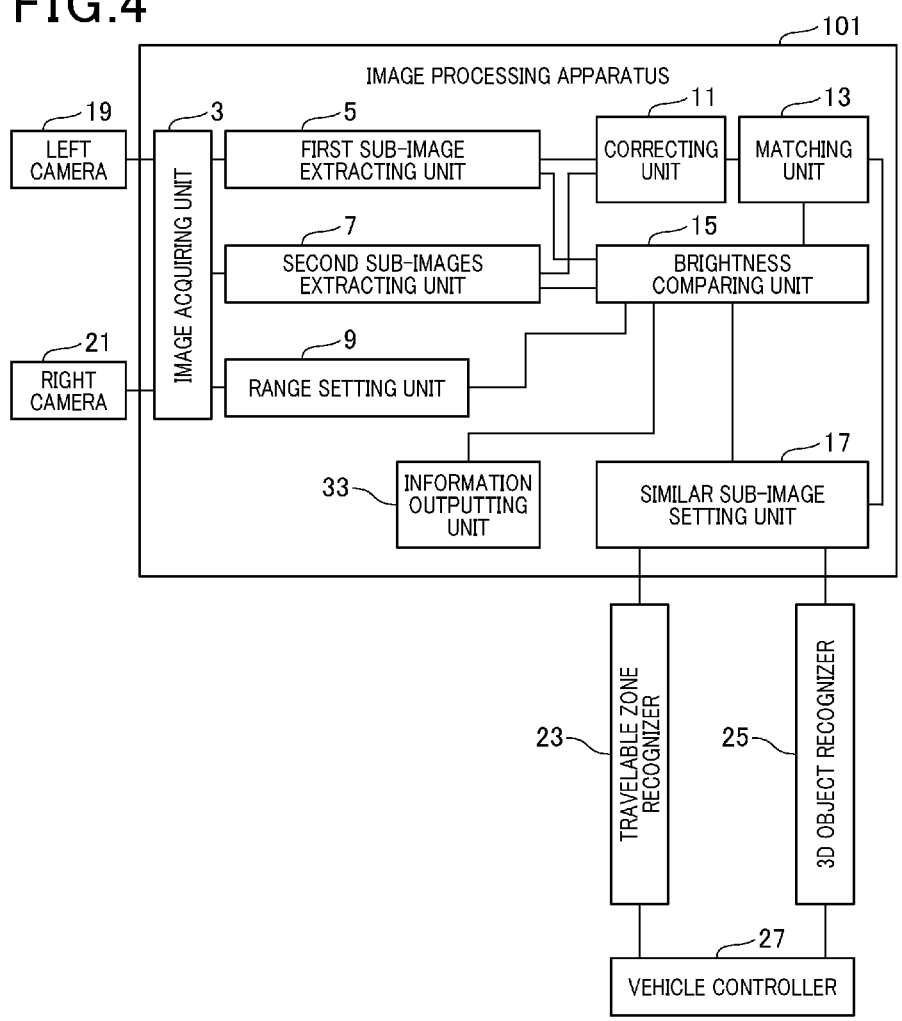
FIG. 4 is a block diagram of an image processing apparatus in accordance with a second embodiment of the present invention.

An image processing apparatus 101 in accordance with a second embodiment of the present invention will now be described with reference to FIG. 4. The image processing apparatus 101 is similar in configuration to that of the first embodiment and thus descriptions about common components will be omitted. Only differences of the second embodiment from the first embodiment are explained. The image processing apparatus 101 further includes an information outputting unit 33. A function of the information outputting unit 33 will be described later.

2. Processing to be Performed in the Image Processing Apparatus

Processing to be performed in the image processing apparatus 101 will now be described with reference to FIG. 5. This processing is similar to that of the first embodiment and thus descriptions about common steps will be omitted. Only differences are explained.

Figure 5:
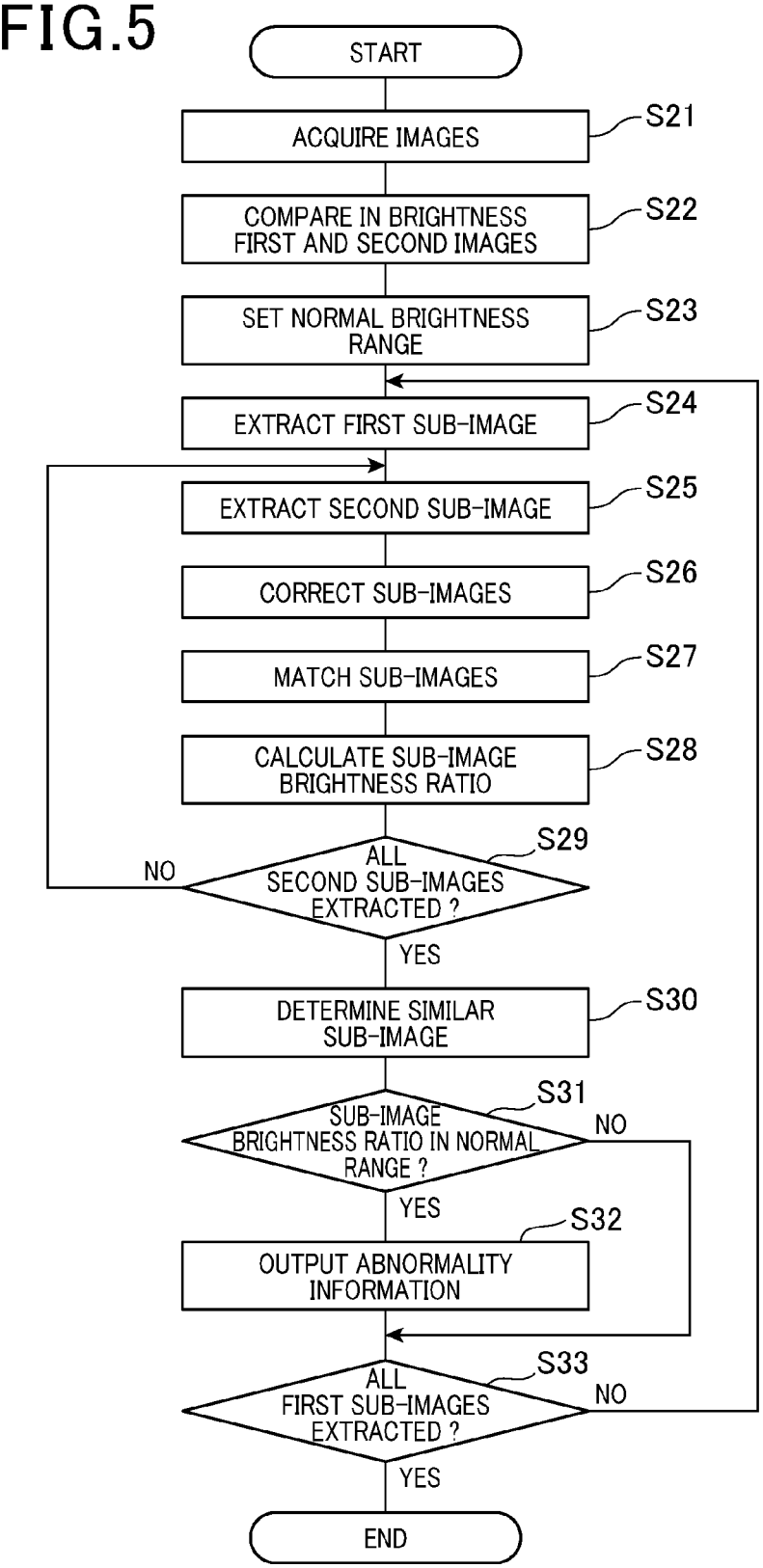
FIG. 5 is a flowchart of processing to be performed in the image processing apparatus of FIG. 4.

Steps S21-S25 in FIG. 5 are respectively similar to steps S1-S5 in the first embodiment.

In subsequent step S26, the correcting unit 11 corrects the brightness of each pixel of the first sub-image last extracted in step S24 and the brightness of each pixel of the second sub-image last extracted in step S25. This brightness correction is performed in a similar manner to that of step S8 in the first embodiment.

In step S27, the matching unit 13 determines a degree of similarity between the corrected first and second sub-images by matching these first and second sub-images. This sub-image matching may be performed in a similar manner to that of step S9 in the first embodiment.

In step S28, the brightness comparing unit 15 compares in brightness the first and second sub-images matched in step S27 to calculate a sub-image brightness ratio r. The sub-image brightness ratio r may be calculated in a similar manner to that of step S6 in the first embodiment.

In step S29, it is determined whether or not all the second sub-images that are vertically even with (match the vertical position of) the first sub-image last extracted in step S24 have been extracted. If it is determined that all the second sub-images that are vertically even with the first sub-image last extracted in step S24 have been extracted, then the process flow proceeds to step S30. Otherwise, the process flow proceeds to step S25.

In step S30, the similar sub-image setting unit 17 sets the second sub-image having the highest degree of similarity determined in step S27, among all the second sub-images extracted corresponding to the first sub-image last extracted in step S24, to be a similar sub-image corresponding to the first sub-image last extracted in step S24.

In step S31, the brightness comparing unit 15 determines whether or not the sub-image brightness ratio r for the first sub-image last extracted in step S24 and its corresponding similar sub-image is in the normal brightness range set in step S23 (i.e., whether or not the sub-image brightness ratio r is normal). If it is determined that the sub-image brightness ratio r is normal, then the process flow proceeds to step S33. Otherwise, the process flow proceeds to step S32.

In step S32, the information outputting unit 33 outputs abnormality information. The abnormality information includes information for identifying the first sub-image and its corresponding similar sub-image for which the sub-image brightness ratio r is not normal or is abnormal. The abnormality information includes information indicative of the sub-image brightness ratio r being abnormal. The abnormality information is stored in the image processing apparatus 101 and outputted to the travelable zone recognizer 23 and the three-dimensional object recognizer 25.

In step S33, it is determined whether or not all the first sub-images have been extracted from the first image. If it is determined that all the first sub-images have been extracted, then the process flow ends. Otherwise, the process flow proceeds to step S24.

3. Advantages (2A) The image processing apparatus 101 is configured to, if the sub-image brightness ratio r for the first sub-image and its corresponding similar sub-image is out of the normal brightness range, output the abnormality information.

The travelable zone recognizer 23 and the 3D object recognizer 25 calculate a difference (disparity) between the position of each first sub-image in the first image and the position of its corresponding similar sub-image in the second image. Based on the disparity, various processing is performed, where processing may be changed with the presence or absence of the abnormality information. For example, the disparity between the first sub-image in the first image and its corresponding similar sub-image in the second image in the presence of the abnormality information may be less weighted than the disparity between the first sub-image in the first image and its corresponding similar sub-image in the second image in the absence of the abnormality information. This allows processing to be performed properly depending on matching reliability.

Third Embodiment

1. Image Processing Apparatus

Figure 6:
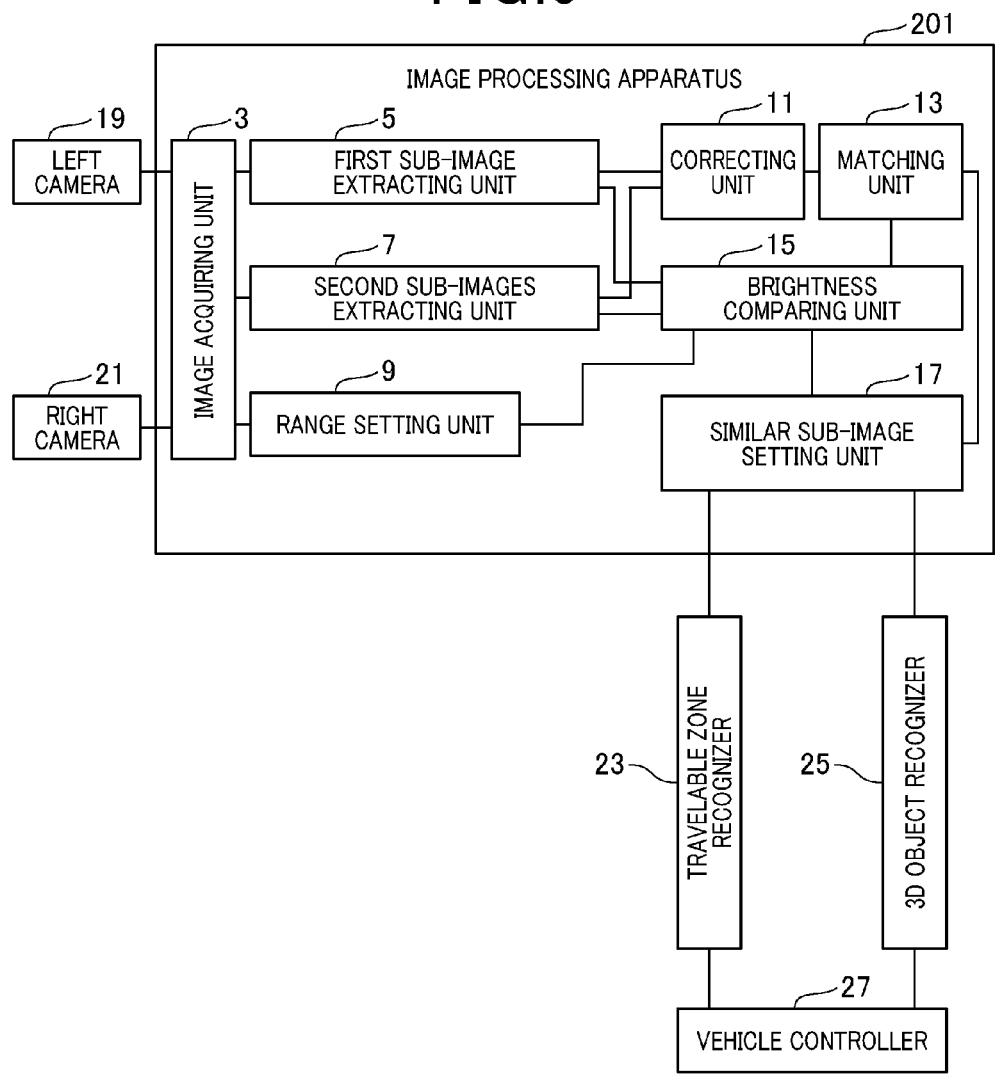
FIG. 6 is a block diagram of an image processing apparatus in accordance with a third embodiment of the present invention.

An image processing apparatus 201 will now be described with reference to FIG. 6. The image processing apparatus 201 is similar in configuration to that of the first embodiment.

2. Processing to be Performed in the Image Processing Apparatus

Processing to be performed in the image processing apparatus 201 will now be described with reference to FIGS. 7 and 8. This processing is similar to that of the first embodiment and thus descriptions about common steps will be omitted. Only differences are explained.

Figure 7:
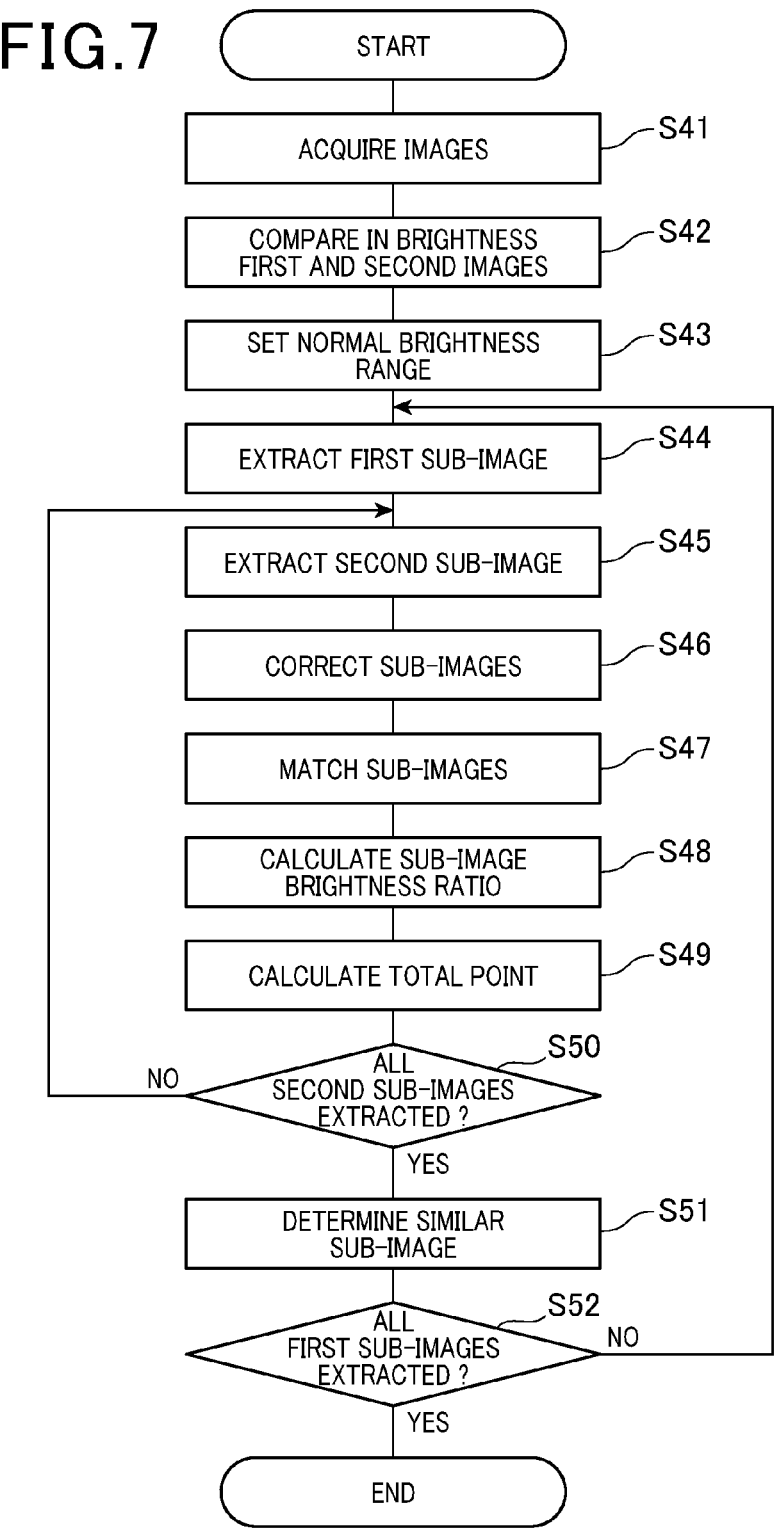
FIG. 7 is a flowchart of processing to be performed in the image processing apparatus of FIG. 6.

Steps S41-S45 in FIG. 7 are respectively similar to steps S1-S5 in the first embodiment.

In step S46, the correcting unit 11 corrects the brightness of each pixel of the first sub-image last extracted in step S44 and the brightness of each pixel of the second sub-image last extracted in step S45. This brightness correction is performed in a similar manner to that of step S8 in the first embodiment.

In step S47, the matching unit 13 determines a degree of similarity between the corrected first and second sub-images by matching these first and second sub-images. This sub-image matching may be performed in a similar manner to that of step S9 in the first embodiment.

In step S48, the brightness comparing unit 15 compares in brightness the first and second sub-images matched in step S47 to calculate a sub-image brightness ratio r. The sub-image brightness ratio r may be calculated in a similar manner to that of step S6 in the first embodiment.

Figure 8A:
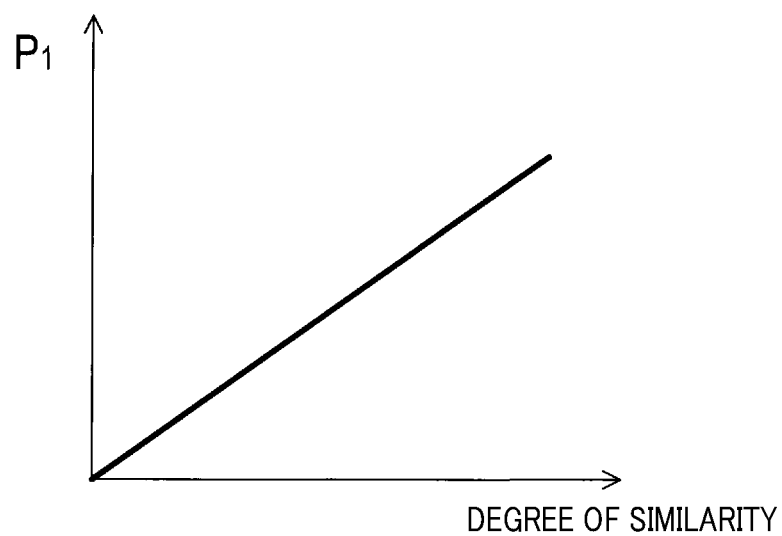
FIG. 8A is a graph illustrating an example of relationship between degree of similarity and point P1.

In step S49, the similar sub-image setting unit 17 calculates a point P1 based on the degree of similarity between the first sub-image and the second sub-image determined in step S47. The similar sub-image setting unit 17 has a map for outputting the point P1 as a function of the degree of similarity to be entered. The similar sub-image setting unit 17 uses such a map to calculate the point P1. As shown in FIG. 8A, a relationship between the degree of similarity and the point P1 is set such that the point P1 increases with increasing degree of similarity.

Figure 8B:
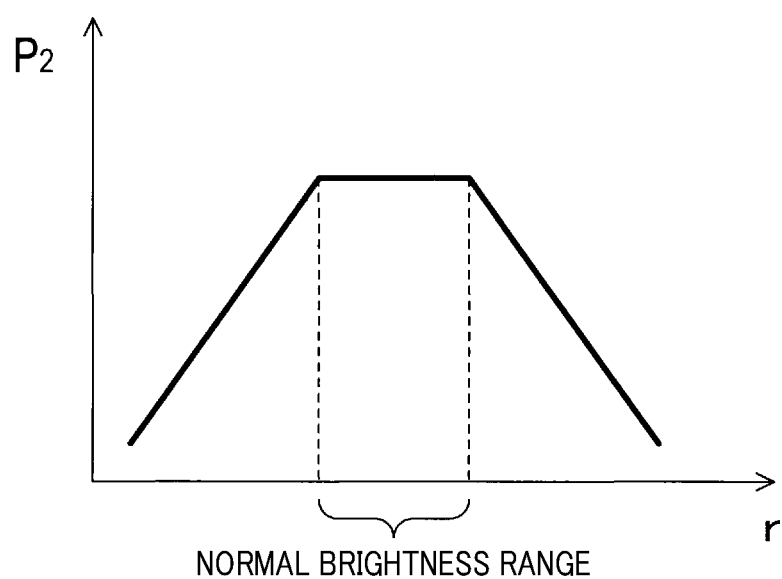
FIG. 8B is a graph illustrating an example of relationship between sub-image brightness ratio and point P2.

Subsequently, the similar sub-image setting unit 17 calculates a point P2 based on the sub-image brightness ratio r calculated in step S48. The similar sub-image setting unit 17 has a map for outputting the point P2 as a function of the sub-image brightness ratio r to be entered. The similar sub-image setting unit 17 uses such a map to calculate the point P2. As shown in FIG. 8B, a relationship between the sub-image brightness ratio r and the point P2 is set such that the point P2 takes a maximum value if the sub-image brightness ratio r is in the normal brightness range set in step S43 and the point P2 decreases as the sub-image brightness ratio r gets farther from the normal brightness range.

Finally, the similar sub-image setting unit 17 calculates a total point P that is a sum of the points P1 and P2.

In step S50, it is determined whether or not all the second sub-images that are vertically even with (or match the vertical position of) the first sub-image last extracted in step S44 have been extracted. If it is determined that all the second sub-images that are vertically even with the first sub-image last extracted in step S44 have been extracted, then the process flow proceeds to step S51. Otherwise, the process flow proceeds to step S45.

In step S51, the similar sub-image setting unit 17 sets the second sub-image having the highest total point calculated in step S49, among all the second sub-images extracted corresponding to the first sub-image last extracted in step S44, to be a similar sub-image corresponding to the first sub-image last extracted in step S44.

In step S52, it is determined whether or not all the first sub-images have been extracted from the first image. If it is determined that all the first sub-images have been extracted, then the process flow ends. Otherwise, the process flow proceeds to step S44.

With the above processing, each first sub-image in the first image and its corresponding similar sub-image in the second image can be determined.

3. Advantages

Other Embodiments

It is to be understood that the invention is not to be limited to the specific embodiments disclosed above and that modifications and other embodiments are intended to be included within the scope of the appended claims.

(1) In an alternative embodiment to any one of the first to third embodiments, dimensions of each of the first and second sub-images is not limited to dimensions of two pixels by two pixels, but may be set as appropriate.

(2) In an alternative embodiment to any one of the first to third embodiments, the first sub-image may be sequentially extracted from the whole or part of the first image so that the extracted first sub-images can cover the whole or part of the first image. The second sub-image may be sequentially extracted from the whole or part of horizontal dimension of the second image.

(3) In an alternative embodiment to any one of the first to third embodiments, when the first and second sub-images are compared in brightness, some of pixels of the first sub-image and some of pixels of the second sub-image may be compared in brightness.

(4) In an alternative embodiment to any one of the first to third embodiments, the normal brightness range may be set in a manner other than that of steps S2 and S3 in the first embodiment. For example, the normal brightness range may be set to a fixed range.

(5) In an alternative embodiment to any one of the first to third embodiments, when calculating the brightness ratio R, K1 may be an average brightness over part of the first image and K2 may be an average brightness over part of the second image.

(6) In an alternative embodiment to the third embodiment, the relationship between the degree of similarity and the point P1 is not limited to the relationship shown in FIG. 8A, but may be set to another as appropriate. In addition, the relationship between the sub-image brightness ratio r and the point P2 is not limited to the relationship shown in FIG. 8B, but may be set to another as appropriate. Further, the total point P may be calculated from the points P1 and P2 in another manner. For example, the total point P may be calculated as a product of the points P1 and P2.

(7) The image processing apparatus 1, 101 or 201 is not limited to a vehicle-mounted apparatus. In addition, the image processing apparatus 1, 101 or 201 may be used not for the purpose of measuring the distance to the target, but for another purpose. (8) In an alternative embodiment to any one of the first to third embodiments, the normal brightness range may be set as follows. A brightness difference D may be calculated by subtracting the average brightness of the second image from the average brightness of the first image. The normal brightness range may be set to be a range including the brightness difference D.

In such an alternative embodiment, in step S6, S28 or S48, a sub-image brightness difference bd may be calculated by subtracting the average brightness of the second sub-image from of the average brightness of the first sub-image. YES may be determined in steps S7 or S31 if the sub-image brightness difference bd is within the normal brightness range. In step S49, the point P2 may be calculated based on the sub-image brightness difference bd.

(9) In an alternative embodiment to any one of the first to third embodiments, whether or not the brightness of the first sub-image and the brightness of the second sub-image are normal may be determined as follows. First, a magnitude relation between the average brightness of the first image and the average brightness of the second image may be acquired as a reference magnitude relation. If it is determined that a magnitude relation between the brightness of the first sub-image and the brightness of the second sub-image coincides with the reference magnitude relation, it may be determined that the brightness of the first sub-image and the brightness of the second sub-image are normal (where YES may be determined in step S7 or S31, or the point P2 may be increased in step S49).

If it is determined that a magnitude relation between the brightness of the first sub-image and the brightness of the second sub-image does not coincide with the reference magnitude relation, it may be determined that the brightness of the first sub-image or the brightness of the second sub-image are not normal (where NO may be determined in step S7 or S31, or the point P2 may be decreased in step S49).

(10) In an alternative embodiment to any one of the first to third embodiments, the first image may be an image captured by the right camera 21 and the second image may be an image captured by the left camera 19.

(11) The functions of one of components of any one of the first to third embodiments may be distributed to a plurality of components, or the functions of a plurality of components may be integrated into one component. At least part of the configuration of any one of the above embodiments may be replaced with a known configuration having a similar function. At least part of the configuration of any one of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

(12) It should be appreciated that the invention is not to be limited to the image processing apparatuses disclosed above and that the present invention can be implemented in numerous ways, including as a system that includes any one of the image processing apparatuses as a component, a program for enabling a computer to function as any one of the image processing apparatuses, a non-transitory computer readable storage medium storing such a program, an image processing method, a ranging method and the like.

What is claimed is:

1. An image processing system for processing images of a target object located in an environment of a vehicle, the image processing apparatus comprising:
    a stereoscopic camera comprising:
        a first camera configured to capture the target object within a first image;
        a second camera configured to capture the target object within a second image;
    a computer comprising:
        an image acquiring unit configured to acquire the first image and the second image;
        a first sub-image extracting unit configured to extract first sub-images from the first image;
        a second sub-image extracting unit configured to extract second sub-images from the second image;
        a matching unit configured to match each pair of the first and second sub-images to determine a degree of similarity between the pair of the first and second sub-images;
        a similar sub-image setting unit configured to, for each of the first sub-images extracted by the first sub-image extracting unit, set the second sub-image having a highest degree of similarity to the first sub-image, among the second sub-images extracted by the second sub-image extracting unit, to be a similar sub-image corresponding to the first sub-image; and
        a brightness comparing unit configured to compare in brightness each pair of the first and second sub-images,
    wherein the matching unit is configured to, if a result of comparison made by the brightness comparing unit between a pair of the first and second sub-images is out of a predetermined brightness range, exclude such a pair of the first and second sub-images from the pairs of the first and second sub-images to be matched; and
    wherein the first and second sub-images are used by at least one of a travelable zone recognizer and an object recognizer to calculate a distance from the vehicle to the target object based on a difference between a position of a target first sub-image of the first image and a position of the similar sub-image in the second image corresponding to the target first sub image, and
    wherein a vehicle control is performed by a vehicle controller based on the distance from the vehicle to the target object.

2. The system of claim 1, the computer further comprising a range setting unit configured to set the brightness range based on a result of comparison in brightness between the first and second images.

3. The system of claim 1, the computer further comprising a correcting unit configured to, for each pair of the first and second sub-images, prior to the matching unit matching the first and second sub-images, correct at least one of the brightness of the first sub-image and the brightness of the second sub-image.

4. The system of claim 3, wherein the correcting unit is configured to correct the at least one of the brightness of the first sub-image and the brightness of the second sub-image to reduce brightness variations caused by lens limb darkening.

5. An image processing system for processing images of a target object located in an environment of a vehicle, the image processing apparatus comprising:
    a stereoscopic camera comprising:
        a first camera configured to capture the target object within a first image;
        a second camera configured to capture the target object within a second image;
    a computer comprising:
        an image acquiring unit configured to acquire the first image and the second image;
        a first sub-image extracting unit configured to extract first sub-images from the first image;
        a second sub-image extracting unit configured to extract second sub-images from the second image;
        a matching unit configured to determine a degree of similarity between each pair of the first and second sub-images;
        a similar sub-image setting unit configured to, for each of the first sub-images extracted by the first sub-image extracting unit, set the second sub-image having a highest degree of similarity to the first sub-image, among the second sub-images extracted by the second sub-image extracting unit, to be a similar sub-image corresponding to the first sub-image;
        a brightness comparing unit configured to compare in brightness each pair of the first and second sub-images; and
        an information outputting unit configured to, if a result of comparison made by the brightness comparing unit between a pair of the first sub-image and its corresponding similar sub-image is out of a predetermined brightness range, output information indicative of such an event; and
    wherein the output information is used by at least one of a travelable zone recognizer and an object recognizer to calculate a distance from the vehicle to the target object based on the output information and a difference between a position of a target first sub-image of the first image and a position of the similar sub-image in the second image corresponding to the target first sub image, and wherein a vehicle control is performed by a vehicle controller based on the distance from the vehicle to the target object.

6. The system of claim 5, the computer further comprising a range setting unit configured to set the brightness range based on a result of comparison in brightness between the first and second images.

7. The system of claim 5, the computer further comprising a correcting unit configured to, for each pair of the first and second sub-images, prior to the matching unit matching the first and second sub-images, correct at least one of the brightness of the first sub-image and the brightness of the second sub-image.

8. The system of claim 7, wherein the correcting unit is configured to correct the at least one of the brightness of the first sub-image and the brightness of the second sub-image to reduce brightness variations caused by lens limb darkening.

9. A method for processing images of a target object located in an environment of a vehicle, the images captured by a first camera and a second camera, the method comprising:

acquiring a first image from the first camera and a second image from the second camera;

extracting first sub-images from the first image;

extracting second sub-images from the second image;

matching each pair of the first and second sub-images to determine a degree of similarity between the first and second sub-images;

setting, for each of the first sub-images extracted, the second sub-image having a highest degree of similarity to the first sub-image, among the second sub-images extracted, to be a similar sub-image corresponding to the first sub-image;

comparing in brightness each pair of the first and second sub-images;

excluding a pair of the first and second sub-images from pairs of first and second sub-images to be matched if the pair of the first and second sub-images is outside of a predetermined brightness range;

wherein the first and second sub-images are used to calculate a distance from the vehicle to the target object based on a difference between a position of a target first sub-image of the first image and a position of the similar sub-image in the second image corresponding to the target first sub image, and wherein a vehicle control is performed based on the distance from the vehicle to the target object.

10. The method of claim 9, further comprising setting the brightness range based on a result of comparison in brightness between the first and second images.

11. The method of claim 9, further comprising correcting at least one of the brightness of the first sub-image and the brightness of the second sub-image for each pair of the first and second sub-images, prior to matching the first and second sub-images.

12. The method of claim 11, further comprising correcting the at least one of the brightness of the first sub-image and the brightness of the second sub-image to reduce brightness variations caused by lens limb darkening.

* * * * *